United States Patent [19]

Uchida et al.

[11] Patent Number: 4,848,557
[45] Date of Patent: Jul. 18, 1989

[54] SKEW-PREVENTING RIBBON SPRING FOR USE IN A ONE-WAY CLUTCH

[75] Inventors: Mikio Uchida, Yamato; Akihiro Ishida, Fujisawa, both of Japan

[73] Assignee: NSK-Warner Kubushiki Kaisha, Tokyo, Japan

[21] Appl. No.: 128,957

[22] Filed: Dec. 4, 1987

[30] Foreign Application Priority Data

Dec. 6, 1986 [JP] Japan ................................ 61-289754

[51] Int. Cl.⁴ .............................................. F16D 41/07
[52] U.S. Cl. ................................... 192/41 A; 192/45.1
[58] Field of Search ........................... 192/41 A, 45.1; 188/82.8

[56] References Cited

U.S. PATENT DOCUMENTS

| | | | |
|---|---|---|---|
| 3,219,163 | 11/1965 | Zlotek | 192/45.1 |
| 4,114,739 | 9/1978 | Colonna et al. | 192/41 A |
| 4,252,221 | 2/1981 | Lanzerath et al. | 192/41 A |
| 4,347,920 | 9/1982 | Bordes | 192/45.1 |

Primary Examiner—Rodney H. Bonck
Assistant Examiner—David A. Testardi
Attorney, Agent, or Firm—Skjerven, Morrill, MacPherson, Franklin & Friel

[57] ABSTRACT

A ribbon spring for use in a sprag-synchronized one-way clutch includes a metal thin plate which is formed with a plurality of sprag insertion holes of a predetermined shape preferably defined by stamping. In one embodiment, the sprag insertion hole is generally E-shaped as defined by a pair of tabs substantially identical in shape and size which extend into the sprag insertion hole from one side edge thereof. In another embodiment, the sprag insertion hole is generally C-shaped as defined by a relatively wide tab which extends into the sprag insertion hole from one side edge thereof and which is formed with a slot. With these structures, the sprag is prevented from wobbling or skewing during operation and an optimal spring constant can be set easily.

11 Claims, 3 Drawing Sheets

SKEW-PREVENTING RIBBON SPRING FOR USE IN A ONE-WAY CLUTCH

BACKGROUND OF THE INVENTION

1. Field of the Invention

This invention, generally, relates to a one-way clutch and, in particular, to a ribbon spring for use in a sprag-synchronzed one-way clutch.

2. Description of the Prior Art

FIG. 1 schematically illustrates the structure of a sprag-synchronized one-way clutch 1. As shown, the sprag-synchronized one-way clutch 1 is to be used as interposed between an inner ring 2 and an outer ring 3 which may rotate coaxially relative to each other. When the inner and outer rings 2 and 3 try to rotate in the opposite directions as indicated by the arrows, the clutch prevents a relative rotation between the inner and outer rings 2 and 3; whereas, when the inner and outer rings 2 and 3 try to rotate in directions opposite to those indicated by the arrows, the clutch allows free relative rotation between the two rings. The sprag-synchronized one-way clutch 1 also includes a pair of ring-shaped outer and inner retainers 4 and 5, each of which is formed with a plurality of sprag insertion holes 4a or 5a as arranged in the circumferential direction at a predetermined pitch. A plurality of sprags 6, each having a specific cross sectional shape which is tapered at the middle and serving as a clutching element between the outer and inner rings 2 and 3, are also provided. Each of the plurality of sprags 6 is disposed as inserted in the corresponding one of the sprag insertion holes 4a and 5a of the outer and inner retainers 4 and 5. Typically, each of the sprags 6 has an outer cam surface 6a, which is defined by one or two radii of curvature, and an inner cam surface 6b, which is defined by a pair of different radii of curvature.

A ribbon spring 7 is disposed between the outer and inner retainers 4 and 5, and moment is normally applied to each of sprags 6 in a predetermined direction by the ribbon spring 7. The ribbon spring 7 is also formed with a plurality of sprag insertion holes 7a at a predetermined pitch, and each of the sprags 6 is inserted into the corresponding one of sprag insertion holes 7a, whereby the sprags 6 are held in position as retained by the ribbon spring 7 approximately at the middle, as shown in FIG 2. The ribbon spring 7 is comprised of a thin plate elongated in shape. After inserting sprags 6 into the insertion holes 7a of the ribbon spring 7, both ends thereof are put together to form a ring, which is then interposed between the inner and outer retainers 4 and 5. As shown in FIG. 2, in an assembled condition, the ribbon spring 7 normally applies a moment to the sprag 6 in a direction indicated by the arrows, so that the sprag 6 is normally biased to be in contact with the inner and outer rings 2 and 3.

The structure of a typical prior art ribbon spring 7 for use in a sprag-synchronized one-way clutch is illustrated in FIGS. 3 and 4. The ribbon spring 7 includes a thin, elongated plate of, for example, stainless steel which is formed with a plurality of sprag insertion holes 7a generally in the shape of a "C" at a predetermined pitch with a tab 7d having a predetermined width projecting into the corresponding insertion hole 7a from one side thereof. It is to be noted that FIG. 4 is a side view of ribbon spring 7 in FIG. 3 showing a partial cross sectional view taken along line I—I indicated in FIG. 3. The ribbon spring 7 includes a pair of side sections 7b, 7b and a plurality of bridging sections 7c arranged along a longitudinal direction at a predetermined pitch as bridging between the pair of side sections 7b and 7b. And, a sprag insertion hole 7a is defined by the pair of side sections 7b and 7b and a pair of bridging sections 7c and 7c. In addition, a tab 7d is formed as a projection projecting into the sprag insertion hole 7a from one side of the corresponding bridging section 7c, and, as a result, the sprag insertion hole 7a is defined generally in the form of letter "C." As shown in FIG. 2, the ribbon spring 7 applies moment to the sprag 6 in a predetermined direction, so that the sprags 6 are biased to be normally in contact with the inner and outer rings 2 and 3. For this reason, it is necessary for the tab 7d to apply a force of an appropriate level to the sprag 6.

As shown in FIG. 5, if for some reason, when the sprag 6 becomes skewed within the sprag insertion hole 7a from the normal position indicated by the dotted line, the contact condition between the sprag 6 and the inner and outer rings 2 and 3 becomes abnormal, so that, during operation, there are brought about various disadvantages, such as wobbling of the sprag 6, excessive wear of the sprag 6 at the portion in contact with the tab 7d, and deformation, damage and popping of the tab 7d, whereby there is a chance that the proper function as a one-way clutch is lost. In order to improve the stabsility of the sprag 6 in the insertion hole 7a, it is conceivable to increase the width W of the tab 7d. However, if the width W of the tab 7d were simply increased, the spring constant of the tab 7d would increase, thereby causing the moment to be applied to the sprag 6 to be excessive which could lead to an increase in dragging torque during idling and the occurrence of breakage due to stress concentration at a corner.

U.S. Pat. No. 4,252,221 issued to Lanzerath et al. on Feb. 24, 1981, proposes to provide a ribbon spring having a plurality of tabss projecting into a sprag insertion window; however, since Lanzerath et al. proposes to provide a center tab which is longer than the other tabs, the sprag tends to be skewed.

SUMMARY OF THE INVENTION

In accordance with one aspect of the present invention, there is provided a ribbon spring for use in a sprag-synchronized one-way clutch, which is comprised of an elongated thin plate of a desired metal, such as stainless steel. A plurality of sprag insertion holes, windows or openings are formed in the elongated thin plate along its longitudinal direction at a predetermined pitch, each hole having a predetermined shape, possibly excepting the hole at each end. In one embodiment, each of the sprag insertion holes is formed, preferably stamped, generally in the shape of a capital letter "E", so that a pair of tabs substantially same in shape is formed as projections extending into the corresponding sprag insertion hole from one side thereof as spaced apart from each other laterally. With this structure, since a pair of spaced apart tabs substantially same in shape extend into the corresponding sprag insertion hole from one side thereof, the spacing between the pair of tabs can be set arbitrarily, so that the tabs may be separated away from each other sufficiently within the allowable range of the corresponding sprag insertion hole, thereby allowing to effectively prevent an associated sprag from being skewed during operation.

In accordance with another embodiment, each of the sprag insertion holes is formed, preferably stamped, generally in the shape of a capital letter "C", so that a single tabs having relatively large width is formed as a projection extending into the corresponding sprag insertion hole from one side thereof. In addition, a slot is formed, preferably stamped, in the wide tabs to remove the central portion of the tabs to thereby adjust the spring constant of the wide tabs at an appropriate value.

It is therefore a primary object of the present invention to obviate the disadvantages of the prior art as described above and to provide an improved one-way clutch.

Another object of the present invention is to provide an improved sprag-synchronized one-way clutch.

A further object of the present invention is to provide an improved ribbon spring for use in a sprag-synchronized one-way clutch.

A still further object of the present invention is to provide an improved ribbon spring capable of applying a required force to an associated sprag or clutch element while preventing the associated sprag from being skewed.

A still further object of the present invention is to provide an improved ribbon spring simple in structure, easy to manufacture and high in performance.

A still further object of the present invention is to provide an improved ribbon spring capable of normally applying moment to an associated sprag in a predetermined direction while preventing the occurrence of wobbling or canting of the associated sprag.

A still further object of the present invention is to provide an improved ribbon spring having a reduced maximum stress while maintaining the spring constant unchanged and having improved fatigue-resistant, wear-resistant and damage-resistant characteristics.

Other objects, advantages and novel features of the present invention will become apparent from the following detailed description of the invention when considered in conjunction with the accompanying drawings.

DESCRIPTION OF THE PREFERRED EMBODIMENTS

Figure 1:
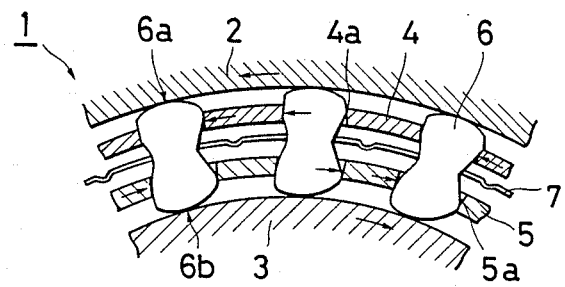
FIG. 1. is a partial, schematic illustration showing the overall structure of a sprag-synchronized one-way clutch.
Figure 2:
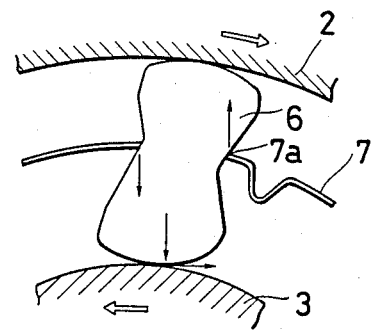
FIG. 2 a schematic illustration showing the function of a ribbon spring with respect to an associated sprag diagramatically.
Figure 3:
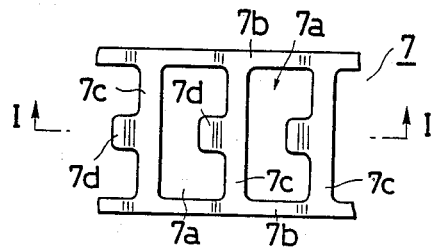
FIG. 3 is a partial, schematic illustration showing the overall structure of a typical prior art ribbon spring for use in a sprag-synchronized one-way clutch of the type shown in FIG. 1.
Figure 4:
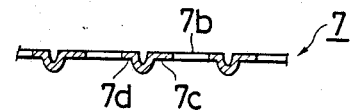
FIG. 4 is a side view of the spring of FIG. 3 and partial cross-sectional view taken along the I—I line indicated in FIG. 3.
Figure 5:
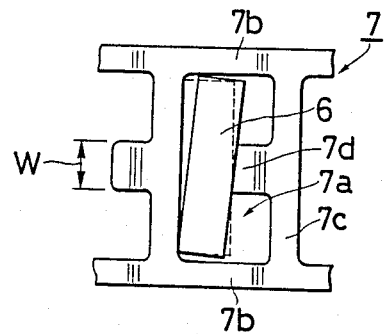
FIG. 5 is an illustration showing how the sprag can be skewed in the prior art ribbon spring.
Figure 6:
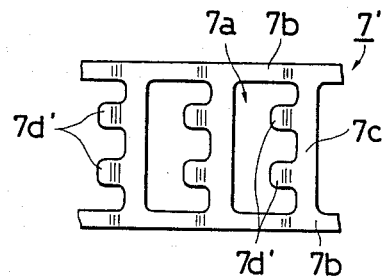
FIGS. 6 and 7 partial, schematic illustrations showing ribbon spings for use in a sprag-synchronized one-way clutch constructed in accordance with two different embodiments of the present invention.

Referring now to FIG. 6, there is schematically shown a ribbon spring 7' for use in a sprag-synchronized one-way clutch constructed in accordance with one embodiment of the present invention. It is to be noted that the ribbon spring 7', in fact, is elongated in shape; however, since the ribbon spring 7' basically has a structure which is a repetition of a predetermined pattern, FIG. 6 shows only a portion of the ribbon spring 7'. As shown, the ribbon spring 7' is basically elongated in shape and it can be preferably formed by stamping a blank of a desired metal, such as stainless steel. As shown, the ribbon spring 7' is formed with a plurality of sprag insertion holes 7a as arranged along the longitudinal direction of the ribbon spring 7' as spaced apart from each other at a predetermined pitch. In the present embodiment, each of the plurality of sprag insertion holes 7a is formed as stamped generally in the shape of a capital "E", so that a pair of tabs 7d' and 7d' is defined as projections which extend in parallel into the corresponding sprag insertion hole 7a from the right-hand side edge thereof as spaced apart from each other.

In this manner, in the present embodiment, the generally E-shaped sprag insertion hole 7a is stamped at a predetermined pitch, so that the ribbon spring 7 includes a pair of side sections 7b and 7b on both sides of its longitudinal axis and a plurality of bridging sections 7c bridging between the pair of side sections 7b and 7b as spaced apart from each other at a predetermined pitch. From one side edge, i.e., the right-hand side edge in the illustrated embodiment, extends a pair of tabs 7d' and 7d' as projections extending into the corresponding sprag insertion hole 7a. Preferably, each of the pair of tabs 7d' and 7d' has substantially the same shape and size. In this manner, in the present embodiment, since a pair of tabs 7d' and 7d' substantially same in shape and size is formed as projections extending into the corresponding sprag insertion hole 7a from the same side edge thereof, the spacing between the pair of tabs 7d' and 7d' can be set at any desired value within the scope of the insertion hole 7a. That is, since the pair of tabs 7d' and 7d' is located as spaced apart from each other, an associated sprag 6 to be fitted into the sprag insertion hole 7a may be prevented from wobbling or skewing within the sprag insertion hole 7a during operation as much as possible. In addition, since the associated sprag 6 is supported by the pair of tabs 7d' and 7d' at two points spaced apart from each other in the widthwise direction of the sprag 6, a required moment can be always applied to the sprag 6 in a predetermined direction, i.e., in a direction parallel with the longitudinal direction of the ribbon spring 7', thereby allowing to obtain a stable sprag performance.

In the present embodiment, since a pair of tabs 7d' and 7d' which are basically independent from each other is provided as extending from one side edge of a sprag insertion hole 7a, the spacing between the two tabs 7d' and 7d' can be set at a desired value and in addition the width of each of the tabs 7d' and 7d' can also be set at a desired value. Although each of the pair of tabs 7d' and 7d' preferably has the same width, it may also be so structured that the pair of tabs 7d' and 7d ' differ in width. At any rate, in the preferred embodiment, because of the presence of basically two identical tabs 7d' and 7d', the resultant or total spring constant of the pair of tabs 7d' and 7d' can be set at any desired value. Moreover, in the present embodiment, the ribbon spring 7' can be manufactured by a single stamping process as in the prior art, so that there is no possibility of complicating the manufacturing process. Although the ribbon spring 7' of the present embodiment includes the bridge section 7c which has a constant width excepting those portions where the tabs 7d' is provided, it may alternatively be so structured that the bridge section 7c has a varying width along its longitudinal direction at least partly, if desired. For example, it may be so structured that the bridge section 7c has a locally widened or narrowed portion between the pair of tabs 7d' and 7d', if desired. In this manner, any desired spring characteristic can be obtained by setting the width of the bridge section 7c at any desired size at least locally.

Figure 7:
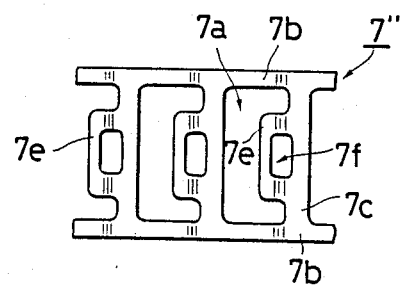

FIG. 7 illustrates another ribbon spring 7'' for use in a sprag-synchronized one-way clutch constructed in accordance with another embodiment of the present invention. In this embodiment also, the ribbon spring 7'' is generally elongated in shape and it is comprised of a thin plate of a desired metal, such as stainless steel. In the present embodiment, a plurality of sprag insertion holes 7a formed preferably as stamped in the ribbon spring 7'' as arranged along the longitudinal direction as spaced apart from each other at a predetermined pitch are generally C-shaped. Thus, there is formed a relatively wide tab 7e which projects into the sprag insertion hole 7a from one side edge thereof. In the illustrated embodiment, the wide tabs 7e has a width in the transverse direction of the ribbon spring 7'' which is substantially equal to the distance between the outer side edges of the pair of spaced tabs 7d' and 7d' in the embodiment shown in FIG. 6, though this embodiment of the present invention should not be limited only to such a structure. Such a tab 7e having a large width has an increased rigidity, so that there is a tendency that the moment to be applied to the associated sprag 6 becomes excessive. However, in the present embodiment, a slot 7f of a predetermined shape and size is formed in the wide tabs 7e so that the central portion of the wide tab 7e is removed.

In this manner, in the present embodiment, since the relatively wide tab 7e is formed as extending into the sprag insertion hole 7a as extending from one side edge thereof and the slot 7f is formed in the tab 7e, the tip end of the wide tab 7e can be set at a relatively large width and the rigidity of the wide tab 7e can be relaxed or reduced appropriately by the slot 7F, thereby allowing a structure which applies an optimal moment to the associated sprag 6.

Also in the embodiment shown in FIG. 7, since the tab 7e is formed to have a relatively large width and the slot 7f is formed in the tab 7e, the tip end of the tab 7e can be set at a relatively large width so as to support the associated sprag 6 over a relatively large region of the sprag 6 in its widthwise direction. Thus, the sprag 6 can be effectively prevented from wobbling and skewing or canting during operation. Besides, it is possible to apply a moment having an appropriate value to the sprag 6 in a desired direction to keep the sprag 6 biased in a desired manner. In addition, also in the present embodiment, the ribbon spring 7'' can be manufactured simply by a single stamping operation, so that there will be no complication in a manufacturing process.

As described in detail above, in accordance with the present invention, it is possible to normally apply a moment of desired value and direction to the associated sprag, and also to prevent the occurrence of excessive wear, wobbling and skewing of the sprag. In addition, in accordance with the present invention, intended objectives can be attained without increasing steps of or complicating the manufacturing process as compared with the prior art methods. In particular, as specific advantages of the present invention, there can be named such advantages as an increase in the fatigue strength of a spring, enhancement of the engaging performance of a sprag, prevention of local wear of a sprag and a tab, relaxation of a stress at the central portion of the bridge section (cross-bar), and an increased degree of freedom in designing a ribbon spring.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. In a one-way clutch having inner and outer rings, a ribbon spring comprising an elongated metal thin plate which is formed with a plurality of sprag insertion holes arranged along a circumferential direction defined by said plate at a predetermined pitch, each of said plurality of sprag insertion holes being generally E-shaped as defined by a pair of flexible tabs which extend in parallel from one side of said sprag insertion hole, said pair of flexible tabs formed to have a desired resultant spring constant so as to impart a first radial force to a sprag inserted into said sprag insertion hole, said E-shaped sprag insertion hole having a flat side opposite to said side of said sprag insertion hole having said tabs, said flat side imparting a second radial force, opposite said first radial force, to said sprag, said first and second radial forces acting together to bias said sprag to be normally in contact with said inner and outer rings, said flexible tabs having ends which lie substantially in axial alignment with the circumferential direction defined by as said thin plate.

2. The ribbon spring of claim 1, wherein said thin plate is bendable to thereby allow said thin plate to define a ring by putting both ends together.

3. The ribbon spring of claim 1, wherein said thin plate includes a pair of elongated side sections extending in parallel as spaced apart over a predetermined distance and a plurality of bridge sections spaced apart from each other at a predetermined pitch, each extending between the pair of side sections, whereby said sprag insertion hole is defined by portions of said pair of side sections and a pair of adjacent bridge sections.

4. The ribbon spring of claim 3, wherein said pair of tabs extend from one side edge of each of said plurality of bridge sections.

5. The ribbon spring of claim 4, wherein said pair of tabs is substantially identical in shape and size.

6. The ribbon spring of claim 5, wherein said pair of tabs extend in a plane substantially the same as a plane defined by said pair of side sections and said plurality of bridge sections.

7. The ribbon spring of claim 3, wherein each of said plurality of bridge sections has a constant width excepting where said pair of tabs is connected thereto.

8. In a one-way clutch having inner and outer rings, a ribbon spring, comprising an elongated metal thin plate which is formed with a plurality of sprag insertion holes arranged along a circumferential direction defined by said plate at a predetermined pitch, each of said plurality of sprag insertion holes being generally C-shaped as defined by a flexible tab which extends into said sprag insertion hole from one side thereof and which is formed with a slot, said flexible tab formed to have a desired spring constant as to impart a first radial force to a sprag inserted into said insertion hole, said C-shaped spray insertion hole having a flat side opposite to said side of said spray insertion hole having said tab, said flat side imparting a second radial force, opposite said first radial force, to said sprag, said first and second radial forces acting together to bias said sprag to be normally in contact with said inner and outer rings, said flexible tab having an end which lies substantially in axial alignment with the circumferential direction defined by said thin plate.

9. The ribbon spring of claim 8, wherein said tab has a relatively large width within a scope limited by said sprag insertion hole.

10. The ribbon spring of claim 8, wherein said thin plate is bendable to thereby allow said thin plate to define a ring by putting both ends together.

11. The ribbon spring of claim 8, wherein said thin plate includes a pair of elongated side sections extending in parallel as spaced apart over a predetermined distance and a plurality of bridge sections spaced apart from each other at a predetermined pitch, each extending between the pair of side sections, whereby said sprag insertion hole is defined by portions of said pair of said sections and a pair of adjacent bridge sections.

* * * * *